United States Patent
Croegaert et al.

(10) Patent No.: US 10,325,061 B2
(45) Date of Patent: Jun. 18, 2019

(54) AUTOMATIC AXIAL THRUST ANALYSIS OF TURBOMACHINERY DESIGNS

(71) Applicant: Mentor Graphics Corporation, Wilsonville, OR (US)

(72) Inventors: Michael James Croegaert, Wheeling, IL (US); Douglas Mitchell Kolak, Northbrook, IL (US); Jacob Arlington Nuetzel, Chicago, IL (US)

(73) Assignee: Mentor Graphics Corporation, Wilsonville, OR (US)

( * ) Notice: Subject to any disclaimer, the term of this patent is extended or adjusted under 35 U.S.C. 154(b) by 288 days.

(21) Appl. No.: 15/454,963

(22) Filed: Mar. 9, 2017

(65) Prior Publication Data

US 2017/0286592 A1 Oct. 5, 2017

Related U.S. Application Data

(60) Provisional application No. 62/314,673, filed on Mar. 29, 2016.

(51) Int. Cl.
   G06F 17/50 (2006.01)
(52) U.S. Cl.
   CPC .................. *G06F 17/5086* (2013.01)
(58) Field of Classification Search
   CPC .................................................. G06F 17/5086
   See application file for complete search history.

(56) References Cited

U.S. PATENT DOCUMENTS

| | | | | |
|---|---|---|---|---|
| 5,760,289 A | * | 6/1998 | Skottegard | F01D 3/04 415/104 |
| 6,129,507 A | * | 10/2000 | Ganelin | F01D 3/00 415/1 |
| 6,748,349 B1 | * | 6/2004 | Majumdar | G05B 17/02 703/2 |
| 7,354,240 B2 | * | 4/2008 | Choi | F01D 3/04 415/104 |

(Continued)

OTHER PUBLICATIONS

Baldassarre, Leonardo et al., "Axial Thrust in High Pressure Centrifugal Compressors: Description of a Calculation Model Validated by Experimental Data from Full Load Test," 44th Turbomachinery and 31st Pump Symposia, pp. 1-10 (2015) (Year: 2015).*

*Primary Examiner* — Rehana Perveen
*Assistant Examiner* — Steven W Crabb (57) ABSTRACT

Various aspects of the disclosed technology relate to axial thrust analysis of turbomachinery designs. A cavity of a turbomachinery design is divided into sub-cavities. Magnitudes of horizontal components of forces exerted on rotational faces in each of the sub-cavities are computed based on computational fluid dynamics, areas of the rotational faces and angles of the rotational faces. The horizontal components are components along a rotational axis of the turbomachinery design. Directions of the horizontal components of the forces are determined based on how many faces a line parallel to the rotational axis intersects between a rotational face of interest and a side of the cavity. A thrust force on a turbine of the turbomachinery design attributed to secondary fluid systems is computed using the magnitudes and the directions of the horizontal components of the forces.

12 Claims, 5 Drawing Sheets

Flow chart 300

(56) References Cited

U.S. PATENT DOCUMENTS

| | | | |
|---|---|---|---|
| 7,542,885 B1* | 6/2009 | Majumdar | G06F 17/5018 |
| | | | 700/83 |
| 2009/0067984 A1* | 3/2009 | Rofka | F01D 3/04 |
| | | | 415/107 |
| 2010/0329845 A1* | 12/2010 | Kim | F01D 3/04 |
| | | | 415/104 |
| 2012/0103111 A1* | 5/2012 | Baller | G01L 3/102 |
| | | | 73/862.325 |
| 2013/0085722 A1* | 4/2013 | James | G06F 17/10 |
| | | | 703/1 |
| 2018/0046749 A1* | 2/2018 | Di Mare | G06F 17/5086 |
| 2018/0149534 A1* | 5/2018 | Kury | F16B 31/02 |

* cited by examiner

Flow chart 300

AUTOMATIC AXIAL THRUST ANALYSIS OF TURBOMACHINERY DESIGNS

RELATED APPLICATIONS

This application claims the benefit of U.S. Provisional Patent Application No. 62/314,673, filed on Mar. 29, 2016, entitled "Net Axial Thrust Analysis For Gas Turbine Engines," and naming Michael James Croegaert et al. as inventors, which application is incorporated entirely herein by reference.

FIELD OF THE DISCLOSED TECHNIQUES

The presently disclosed techniques relates to the field of fluid flow simulation and turbomachinery design technology. Various implementations of the disclosed techniques may be particularly useful for determining axial thrust loads attributed to secondary fluid systems.

BACKGROUND OF THE DISCLOSED TECHNIQUES

The axial thrust of a gas turbine is determined by two distinct types of loads. The aerodynamic load exerted on the turning blades of the compressor and the turbine. There are also pressure forces which act on the rotor in the axial direction. The total resulting force is applied to the thrust bearing of the gas turbine. Optimizing the bearing size can maximize the bearing life while minimizing the power loss due to the bearing resistance. To properly size the bearing both the aerodynamic and pressure loads must be calculated. Both of these load types vary with the operating parameters. The aerodynamic loads can be calculated in a relatively straight forward manner due to the consistent and repeating geometry that is being acted on. The pressure forces are more complicated since the varying geometry of the rotor attachment structures from stage to stage. Therefore the pressure generated in each cavity formed by the rotor and stator disks must be considered separately. Unlike the aerodynamic forces which all act in the same direction, the pressure forces can act either in the gas flow direction or opposite to the gas flow direction depending on the position of the cavity with respect to the rotor disk. Therefore, the sum of all the pressure forces can have either a net positive or net negative load on the bearing.

Two methods have been used for calculating the thrust loads attributed to secondary air systems (the pressure forces). In the first method, either a one dimensional fluid flow software or a 3D computational fluid dynamics (CFD) software would be used to determine the average static pressure for the entire cavity formed by the rotating and stationary blade disks of a gas turbine engine. The vertical distance from the bottom of the cavity to the top is measured for each side that is rotating. The area of that surface is then manually calculated using the formula for the area of an annulus. This area is then multiplied by the static pressure calculated in the simulation tool to get the force applied on the bearing by that surface.

Assume the rotational axis of the gas turbine is horizontal and the gas flow direction is from left to right. If the surface is on the left side of the cavity, the force is considered negative. If it is on the right side then it is considered positive. This is then repeated for all the cavities in the engine and all the forces are summed up to determine the net force on the bearing.

This method is not accurate because the pressure can vary significantly across the span of the surface. Averaging the pressure inherently thus introduces an error. This method is not labor intensive however and is commonly used at least in the early design process.

The second method is similar to the first one except the vertical areas are broken up into smaller segments and the static pressure is determined based on simulation for each of the discretized segments. The vertical distance of each annular sector is measured and the area of the annulus is calculated. The static pressure is then multiplied by the area of the annulus to get the force on the annular area. The forces for all of the annuli for a particular surface are summed and the direction of the force is determined in the same manner as the first method.

The above process is then repeated for all vertical rotating surfaces for all the cavities in the engine and all the forces are summed up to determine the net force on the bearing. This method is more accurate than the first method since the pressures are averaged over a much smaller area. The tradeoff is it is more labor intensive. As such, the method is normally used once designs are nearly finalized.

Both of the aforementioned conventional methods require human involvement in determining the direction of the forces. Even the more accurate second method may not be accurate enough for some applications. It is desirable to develop a method that enables computers to determine force directions automatically and to compute the thrust loads more accurately.

BRIEF SUMMARY OF THE DISCLOSED TECHNIQUES

Various aspects of the disclosed technology relate to axial thrust analysis of turbomachinery designs. In one aspect, there is a method, executed by at least one processor of a computer, comprising: dividing a cavity of a turbomachinery design into sub-cavities, the cavity describing geometry of a cross-sectional area between rotational and stationary components of the turbomachinery design or between rotational and rotational components of the turbomachinery design; computing magnitudes of horizontal components of forces exerted on rotational faces in each of the sub-cavities, the horizontal components being components along a rotational axis of the turbomachinery design; determining directions of the horizontal components of the forces based on how many faces a line parallel to the rotational axis intersects between a rotational face of interest and a side of the cavity, the rotational face of interest being one of the rotational faces; and computing a thrust force on a turbine of the turbomachinery design based on the magnitudes and the directions of the horizontal components of the forces.

In some embodiments of the disclosed technology, the line parallel to the rotational axis intersects the rotational face of interest at a mid-point of the rotational face of interest and extends through the side of the cavity following a flow direction of the turbomachinery design, and the direction of the horizontal component of the force on the rotational face of interest is positive if the number of the faces intersected is odd and negative if the number of the faces intersected is even.

The magnitude computation for the horizontal components of the forces may comprise determining static pressure based on computational fluid dynamics, areas of the rotational faces and angles of the rotational faces. The turbomachinery design may be a gas turbine design.

In another aspect, there are one or more non-transitory computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclose techniques. Thus, for example, those skilled in the art will recognize that the disclose techniques may be embodied or carried out in a manner that achieves or optimizes one advantage or group of advantages as taught herein without necessarily achieving other objects or advantages as may be taught or suggested herein.

DETAILED DESCRIPTION OF THE
DISCLOSED TECHNIQUES

General Considerations

Various aspects of the disclosed technology relate to axial thrust analysis of turbomachinery designs. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of a fluid and thermal simulation tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine," "divide," and "compute" to describe the disclosed methods. Such terms are high-level abstractions of the actual operations that are performed. The actual operations that correspond to these terms will vary depending on the particular implementation and are readily discernible by one of ordinary skill in the art.

Illustrative Operating Environment

Figure 1:
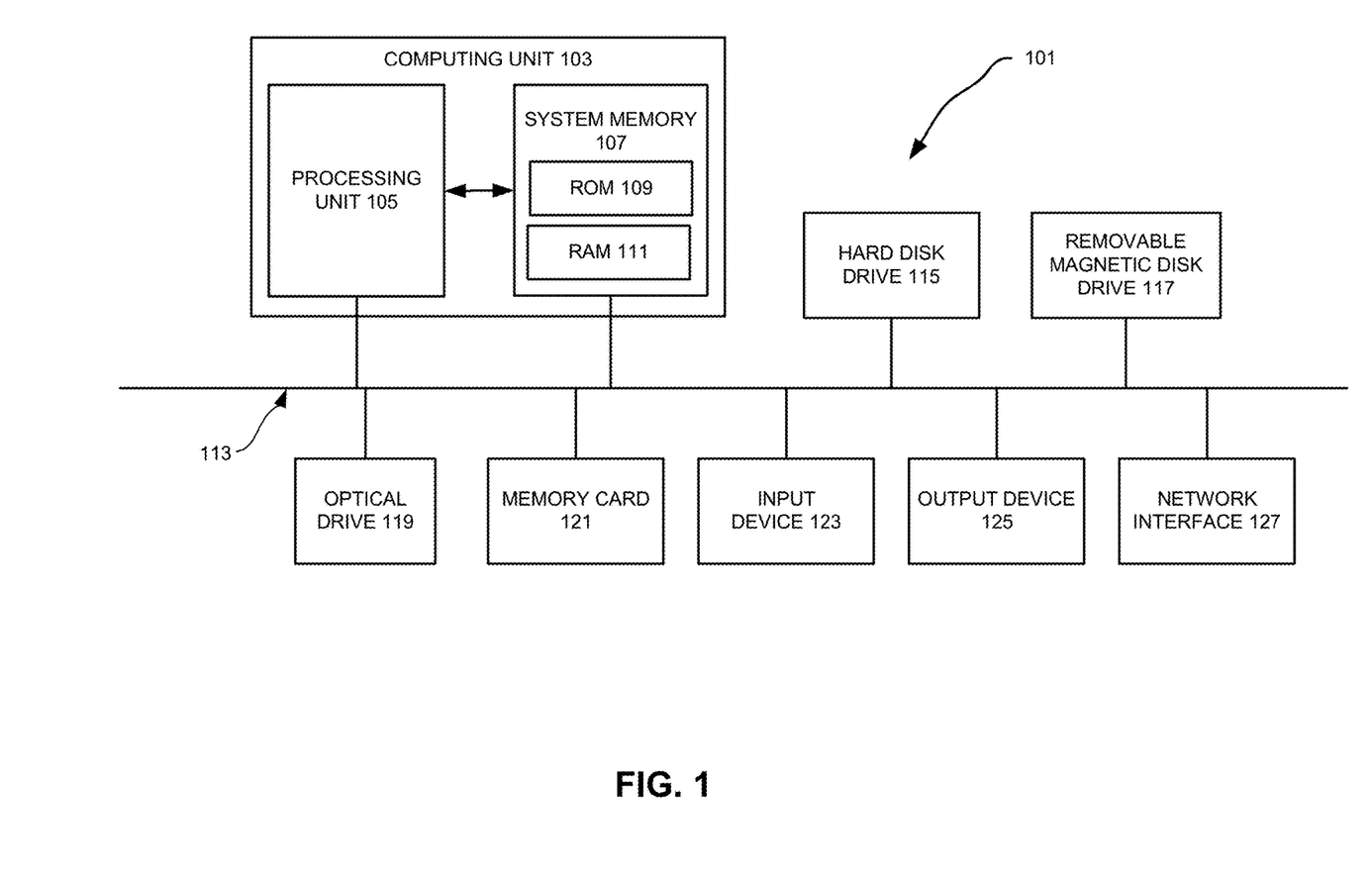
FIG. 1 illustrates a programmable computer system with which various embodiments of the disclosed technology may be employed.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" disk drive 115 (e.g., magnetic storage device or solid state storage device), a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multi-processor computer, a plurality of single and/or multiprocessor computers arranged into a network, or some combination of both.

Axial Thrust Analysis Tool

Figure 2:
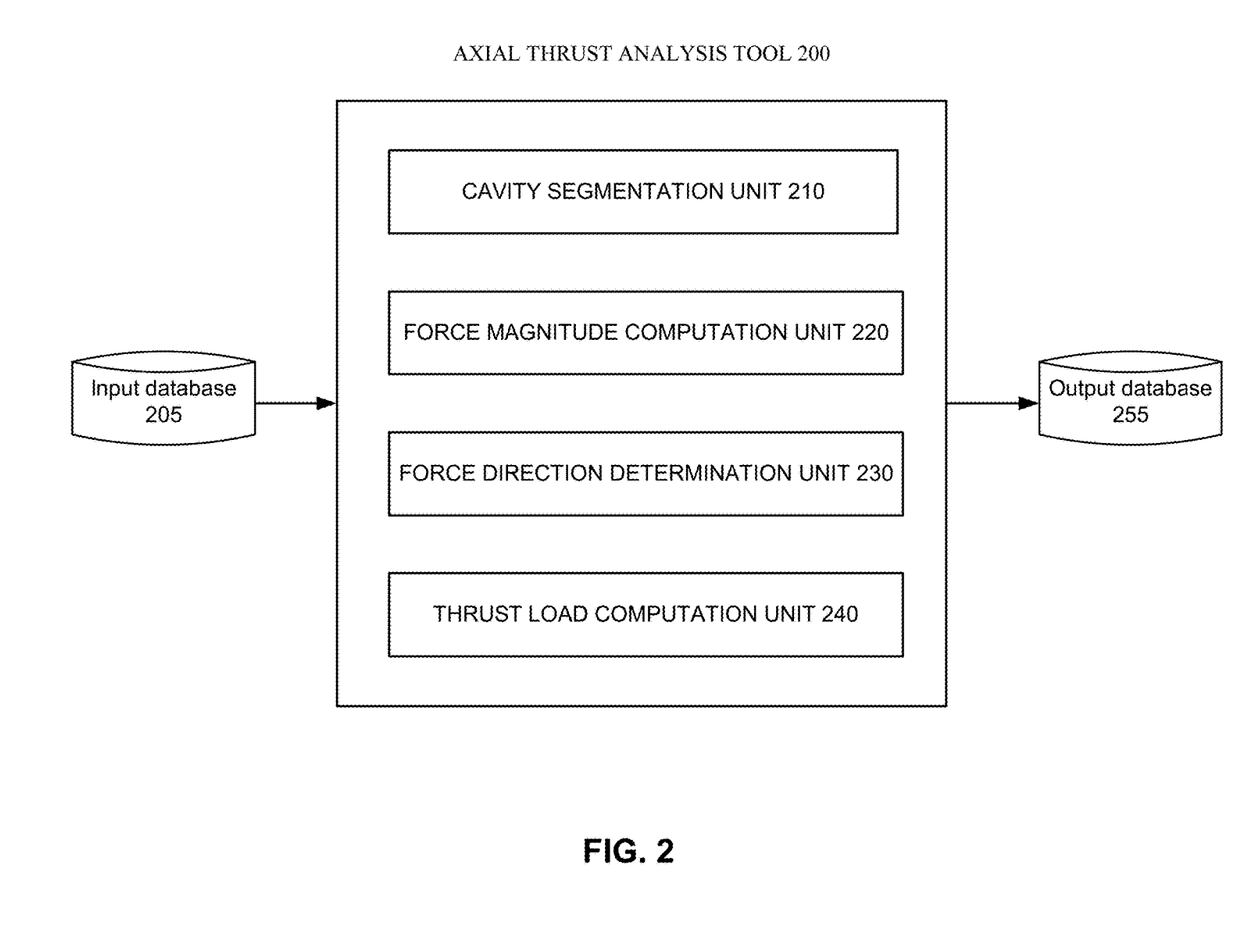
FIG. 2 illustrates an axial thrust analysis tool according to various embodiments of the disclosed technology

FIG. 2 illustrates an example of an axial thrust analysis tool 200 that may be implemented according to various embodiments of the disclosed technology. As seen in this figure, the axial thrust analysis tool 200 includes a cavity segmentation unit 210, a force magnitude computation unit 220, a force direction determination unit 230 and a thrust load computation unit 240. Some implementations of the axial thrust analysis tool 200 may cooperate with (or incorporate) one or both of an input database 205 and an output database 255.

As will be discussed in more detail below, the axial thrust analysis tool 200 may receive information of a turbomachinery design. The turbomachinery design includes cavities, each of which describes geometry of a cross-sectional area between rotational and stationary components of the turbomachinery design or between rotational and rotational components of the turbomachinery design. The cavity segmentation unit 210 divides each of the cavities into sub-cavities. Each of the sub-cavities includes faces such as rotational faces, stationary faces, fluid faces, or any combination thereof. The force magnitude computation unit 220 computes magnitudes of horizontal components of forces exerted on the rotational faces. The horizontal components are components along a rotational axis of the turbomachinery design. The force direction determination unit 230 determines directions of the horizontal components of the forces. The determination comprises computing how many faces a line parallel to the rotational axis intersects between a rotational face of interest and a side of the cavity. The thrust load computation unit 240 computes a thrust force on a turbine of the turbomachinery design based on the magnitudes and the directions of the horizontal components of the forces. The axial thrust analysis tool 200 may store the result in the output database 255.

As previously noted, various examples of the disclosed technology may be implemented by one or more computing systems, such as the computing system illustrated in FIG. 1. Accordingly, one or more of the cavity segmentation unit 210, the force magnitude computation unit 220, the force direction determination unit 230 and the thrust load computation unit 240 may be implemented by executing programming instructions on one or more processors in one or more computing systems, such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the cavity segmentation unit 210, the force magnitude computation unit 220, the force direction determination unit 230 and the thrust load computation unit 240. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the cavity segmentation unit 210, the force magnitude computation unit 220, the force direction determination unit 230 and the thrust load computation unit 240 are shown as separate units in FIG. 2, a single computer (or a single processor within a master computer) or a single computer system may be used to implement all of these units at different times, or components of these units at different times.

With various examples of the disclosed technology, the input database 205 and the output database 255 may be implemented using any suitable computer readable storage device. That is, either of the input database 205 and the output database 255 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 205 and the output database 255 are shown as separate units in FIG. 2, a single data storage medium may be used to implement some or all of these databases.

Axial Thrust Analysis

Figure 3:
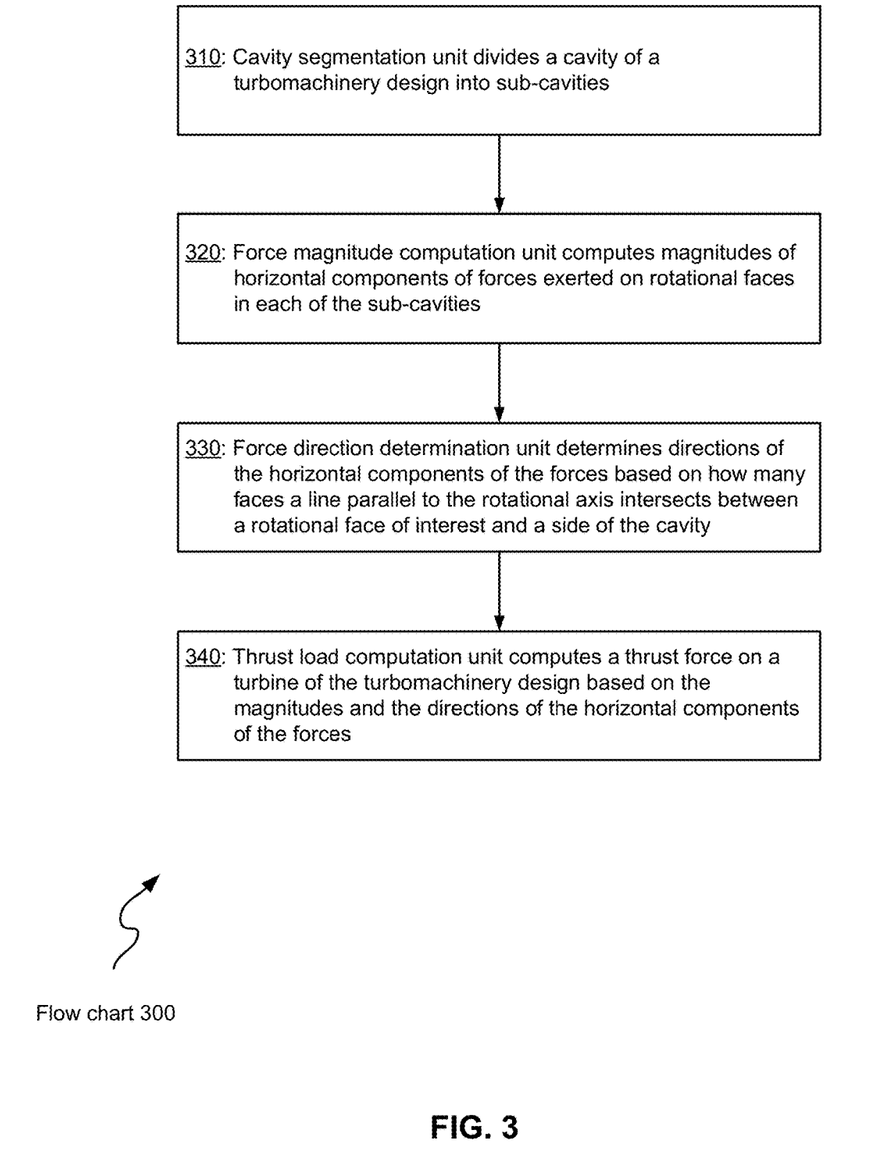
FIG. 3 illustrates a flowchart showing a process of axial thrust diagnosis that may be implemented according to various examples of the disclosed technology.

FIG. 3 illustrates a flowchart 300 showing a process of axial thrust analysis that may be implemented according to various examples of the disclosed technology. For ease of understanding, methods of axial thrust analysis that may be employed according to various embodiments of the disclosed technology will be described with reference to the axial thrust analysis tool 200 illustrated in FIG. 2 and the flow chart 300 in FIG. 3. It should be appreciated, however, that alternate implementations of an axial thrust analysis tool may be used to perform the method of axial thrust analysis shown in the flow chart 300 according to various embodiments of the disclosed technology. In addition, it should be appreciated that implementations of the axial thrust analysis tool 200 may be employed to implement methods of axial thrust analysis according to different embodiments of the disclosed technology other than the one illustrated by the flow chart 300 in FIG. 3.

In operation 310, the cavity segmentation unit 210 divides a cavity of a turbomachinery design into sub-cavities. The turbomachinery design may be received from the database 210. One example of the turbomachinery design is a design of a gas turbine. Two common types of gas turbines are jet engines for jet aircraft and rockets and gas turbines for power generation. A turbomachine includes rotational components such as rotors with blades on its circumference. The rotational components are connected to the turbine shaft. A turbomachine also include stationary components such as stators with stator blades. The stationary components are not connected to the turbine shaft and thus do not exhibit force on the turbine shaft.

The cavity describes geometry of a cross-sectional area between rotational and stationary components of the turbomachinery design or between rotational and rotational components of the turbomachinery design. The surface of a rotational component in the cavity is referred to as a rotational face and the surface of a stationary component in the cavity is referred to as a stationary face. A sub-cavity may also comprise fluid faces, which are faces modeling surfaces of the sub-cavity that have no solid geometry. Fluid faces are defined by gridlines that divide a cavity into sub-cavities.

Figure 4A:
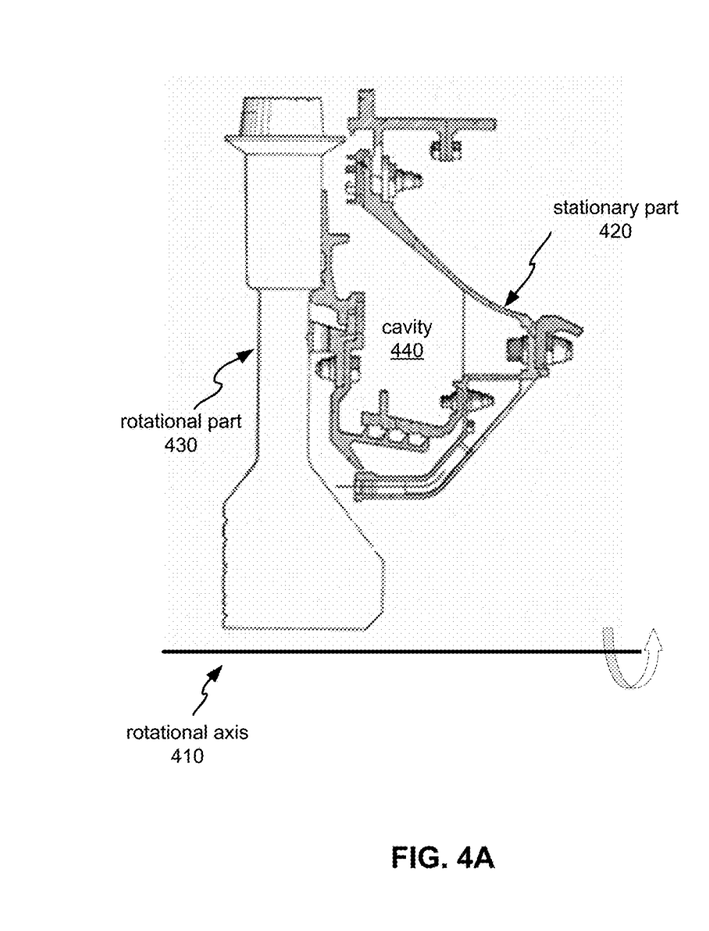
FIG. 4A illustrates a portion of a gas turbine design which includes a cavity.
Figure 4B:
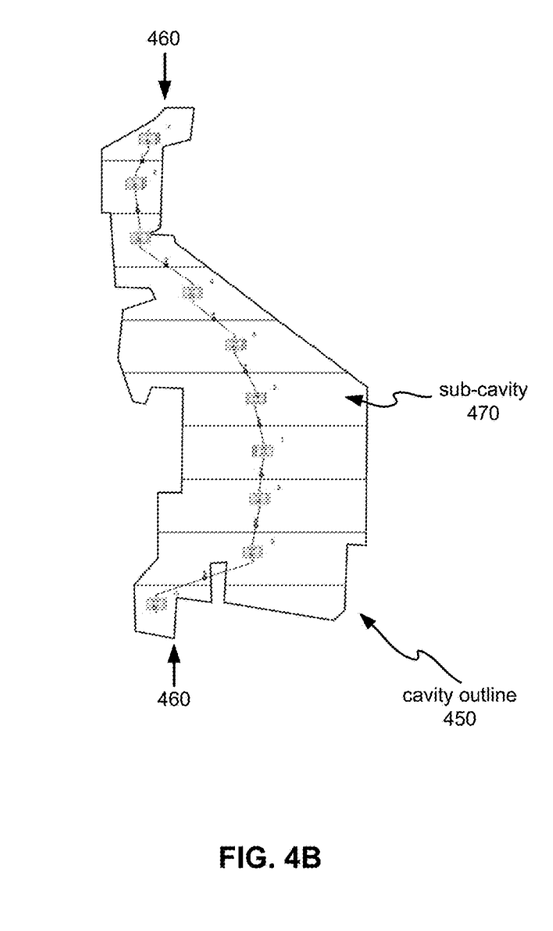
FIG. 4B illustrates the outline of the cavity shown in FIG. 4A.
Figure 4C:
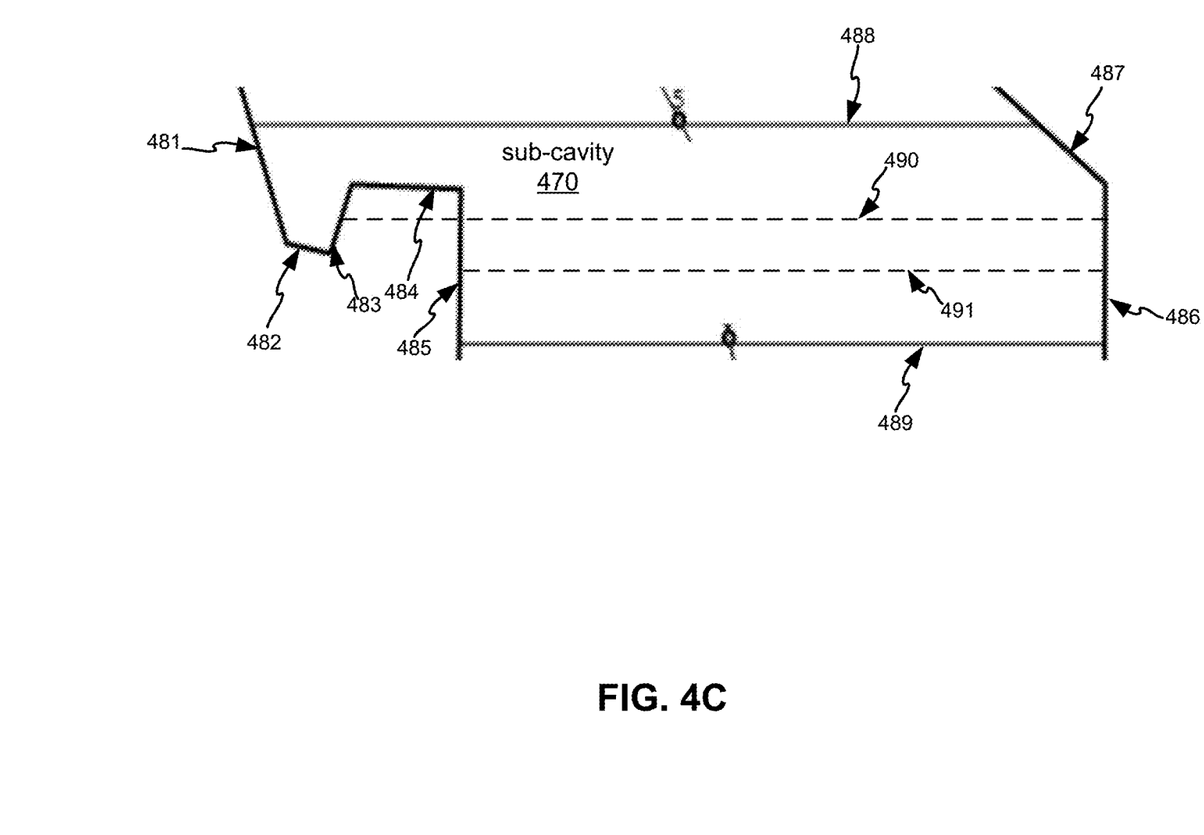
FIG. 4C illustrates a sub-cavity of the cavity shown in FIG. 4B.

FIG. 4A illustrates a portion of a gas turbine design. In the figure, the rotational axis 410 of the turbomachinery design is horizontal. A rotational part 430 and a stationary part 420 form a cavity 440. The cavity 440 can be represented by an outline of the cavity. FIG. 4B illustrates the outline 450 of the cavity 440. Faces on the left side of arrows 460 are rotational faces while those one the right side are stationary faces. The cavity segmentation unit 210 may divide the cavity 440 into ten sub-cavities (sometimes also referred to as cells) as shown by horizontal gridlines in FIG. 4B. These horizontal gridlines are fluid faces. A sub-cavity 470 is illustrated in FIG. 4C. The sub-cavity 470 has five rotational faces 481-485, two stationary faces 486-487 and two fluid faces 488-489.

The number of sub-cavities may be predefined or provided by a user. Dividing the cavity into more sub-cavities can generate more accurate results but may require more computation time and resources.

In operation 320, the force magnitude computation unit 220 computes magnitudes of horizontal components of forces exerted on rotational faces in each of the sub-cavities. The magnitude of a force exerted on a rotational face is a product of the static pressure and the area of the rotational face. The magnitude of the horizontal component of the force can be derived based on the angle of the rotational face. The static pressure may be determined by a commercially available one-dimensional fluid flow software tool (e.g., those in the FloMASTER family of software tools available from Mentor Graphics Corporation, Wilsonville, Oreg.) or a 3D CFD software tool (those in the FloEFD family of software tools available from Mentor Graphics Corporation). All horizontal rotational faces may be excluded from the process because only the forces along the axis of the shaft (the rotational axis) are of interest. In the example shown in FIG. 4C, the force magnitude computation unit 220 will computes the magnitudes of horizontal components of forces for the rotational faces 481-483 and 485. The rotational face 484 is parallel to the rotational face and thus the horizontal component of the force is zero.

In operation 330, the force direction determination unit 230 determines directions of the horizontal components of the forces based on how many faces a line parallel to the rotational axis intersects between a rotational face of interest and a side of the cavity. Given a design diagram, a human being can readily determine the directions of the horizontal components of the forces. The forces exerted from the left side of the faces may be designated as positive while the forces exerted from the right side of the faces may be designated as negative. A computer, however, cannot "see" as a human being. Instead, the force direction determination unit 230 counts the number of faces a line parallel to the rotational axis intersects between a rotational face of interest and a side of the cavity.

Simple algebra may be used to determine whether a line and a face intersect. The line may, for example, be represented by a line segment starting from the mid-point of the rotational face of interest through a side of the cavity following the flow direction of the turbomachinery design. The direction of the horizontal component of the force on the particular face is positive if the number of the faces intersected is odd and negative if the number of the faces intersected is even. It should be appreciated that the above line segment is just an example and the line can be represented by a different line segment which may start from a different point and/or extend to a different direction.

Two such line segments 490 and 491 are shown in FIG. 4C. The line segment 491 starts from the mid-point of the rotational face 485 and intersects the stationary face 486. The number is odd and thus the direction of the force may be designated as positive. The line segment 490 starts from the mid-point of the rotational face 483 and intersects the rotational face 485 and the stationary face 486. The number is even and thus the direction of the force is designated as negative. In the above example, the rightmost side off the sub-cavity is considered as the side where the line segment intersects. Alternatively, any side the line segment intersects may be used. In this case, the line segment 490 intersects zero face which is still even and the same result is derived.

In operation 340, the thrust load computation unit 240 computes a thrust force on a turbine of the turbomachinery design based on the magnitudes and the directions of the horizontal components of the forces. The horizontal components of forces exerted on all of the rotational faces are added together to derive the thrust force attributed to secondary fluid systems. The thrust force attributed to aerodynamic forces can be calculated in a relatively straight forward manner. The two can be added up to derive the total force on the turbine which can be used for optimizing the turbomachinery design, for example, the bearing size. The optimization may maximize the bearing life while minimize the power loss.

While the disclosed technology has been described with respect to gas turbines, it should be appreciated that various examples of the disclosed technology may be implemented into a design process of various turbomachines.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A method, executed by at least one processor of a computer, comprising:
   dividing a cavity of a turbomachinery design into sub-cavities, the cavity describing geometry of a cross-sectional area between rotational and stationary components of the turbomachinery design or between the rotational components of the turbomachinery design;
   computing magnitudes of horizontal components of forces exerted on rotational faces in each of the sub-cavities, the horizontal components being components along a rotational axis of the turbomachinery design;
   determining directions of the horizontal components of the forces based on how many faces a line parallel to the rotational axis intersects between a rotational face of interest and a side of the cavity, the rotational face of interest being one of the rotational faces; and
   computing a thrust force on a turbine of the turbomachinery design based on the magnitudes and the directions of the horizontal components of the forces.

2. The method recited in claim 1, wherein the line parallel to the rotational axis intersects the rotational face of interest at a mid-point of the rotational face of interest and extends through the side of the cavity following a flow direction of the turbomachinery design, and the direction of the horizontal component of the force on the rotational face of interest is positive if the number of the faces intersected is odd and negative if the number of the faces intersected is even.

3. The method recited in claim 1, wherein the computing magnitudes of horizontal components of forces comprises determining static pressure based on computational fluid dynamics, areas of the rotational faces and angles of the rotational faces.

4. The method recited in claim 1, wherein the turbomachinery design is a gas turbine design.

5. One or more non-transitory processor-readable media storing processor-executable instructions for causing one or more processors to perform a method, the method comprising:
dividing a cavity of a turbomachinery design into sub-cavities, the cavity describing geometry of a cross-sectional area between rotational and stationary components of the turbomachinery design or between the rotational components of the turbomachinery design;
computing magnitudes of horizontal components of forces exerted on rotational faces in each of the sub-cavities, the horizontal components being components along a rotational axis of the turbomachinery design;
determining directions of the horizontal components of the forces based on how many faces a line parallel to the rotational axis intersects between a rotational face of interest and a side of the cavity, the rotational face of interest being one of the rotational faces; and
computing a thrust force on a turbine of the turbomachinery design based on the magnitudes and the directions of the horizontal components of the forces.

6. The one or more non-transitory processor-readable media recited in claim 5, wherein the line parallel to the rotational axis intersects the rotational face of interest at a mid-point of the rotational face of interest and extends through the side of the cavity following a flow direction of the turbomachinery design, and the direction of the horizontal component of the force on the rotational face of interest is positive if the number of the faces intersected is odd and negative if the number of the faces intersected is even.

7. The one or more non-transitory processor-readable media recited in claim 5, wherein the computing magnitudes of horizontal components of forces comprises determining static pressure based on computational fluid dynamics, areas of the rotational faces and angles of the rotational faces.

8. The one or more non-transitory processor-readable media recited in claim 5, wherein the turbomachinery design is a gas turbine design.

9. A system, comprising:
one or more processors, the one or more processors programmed to perform a method, the method comprising:
dividing a cavity of a turbomachinery design into sub-cavities, the cavity describing geometry of a cross-sectional area between rotational and stationary components of the turbomachinery design or between the rotational components of the turbomachinery design;
computing magnitudes of horizontal components of forces exerted on rotational faces in each of the sub-cavities, the horizontal components being components along a rotational axis of the turbomachinery design;
determining directions of the horizontal components of the forces based on how many faces a line parallel to the rotational axis intersects between a rotational face of interest and a side of the cavity, the rotational face of interest being one of the rotational faces; and
computing a thrust force on a turbine of the turbomachinery design based on the magnitudes and the directions of the horizontal components of the forces.

10. The system recited in claim 9, wherein the line parallel to the rotational axis intersects the rotational face of interest at a mid-point of the rotational face of interest and extends through the side of the cavity following a flow direction of the turbomachinery design, and the direction of the horizontal component of the force on the rotational face of interest is positive if the number of the faces intersected is odd and negative if the number of the faces intersected is even.

11. The system recited in claim 9, wherein the computing magnitudes of horizontal components of forces comprises determining static pressure based on computational fluid dynamics, areas of the rotational faces and angles of the rotational faces.

12. The system recited in claim 9, wherein the turbomachinery design is a gas turbine design.

* * * * *